April 11, 1939.  W. N. LOUGHMILLER  2,153,722
TRAILER TONGUE SUPPORTING JACK
Filed May 14, 1938  2 Sheets-Sheet 1
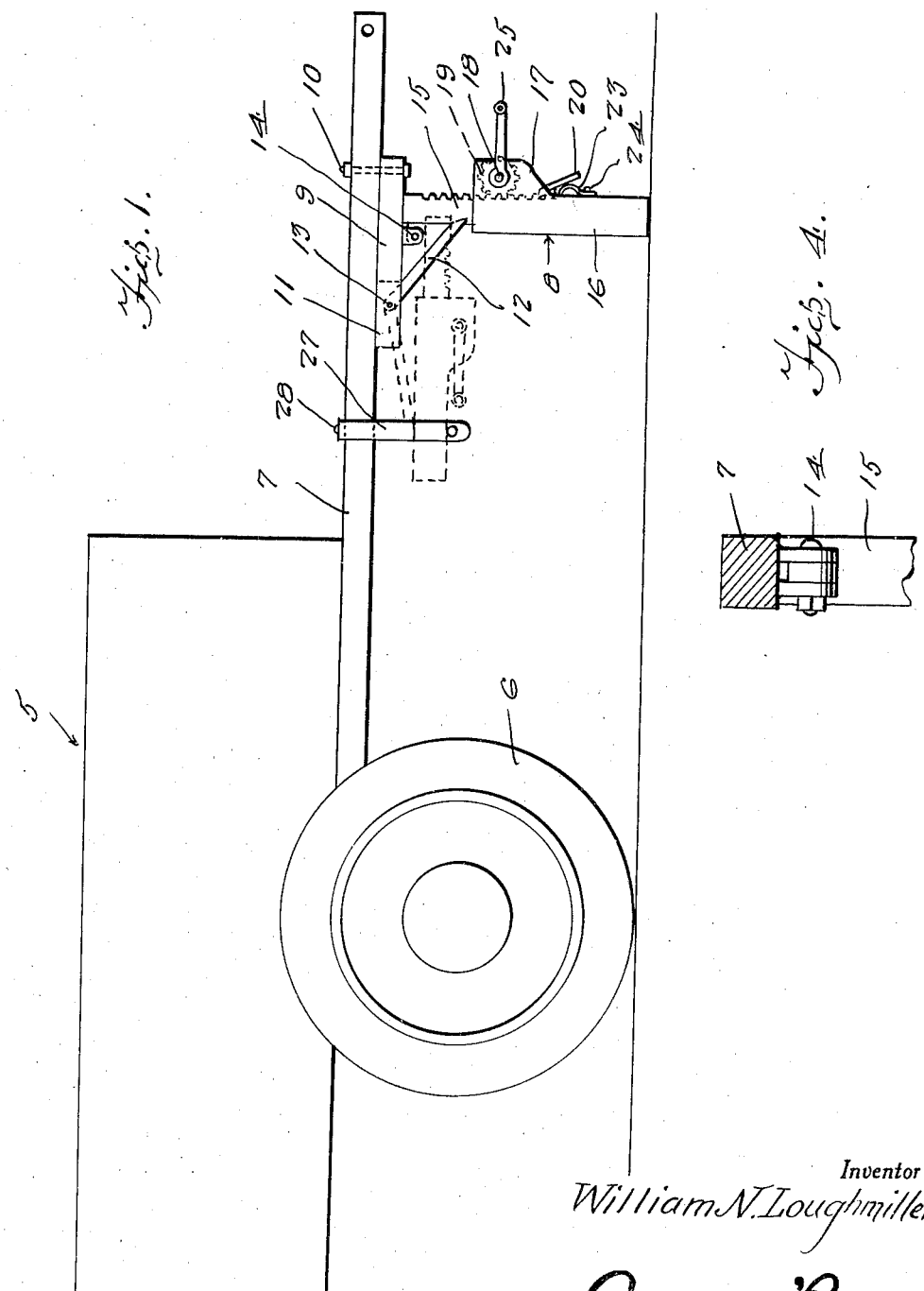
Inventor
William N. Loughmiller
By Clarence A. O'Brien
Hyman Berman
Attorneys

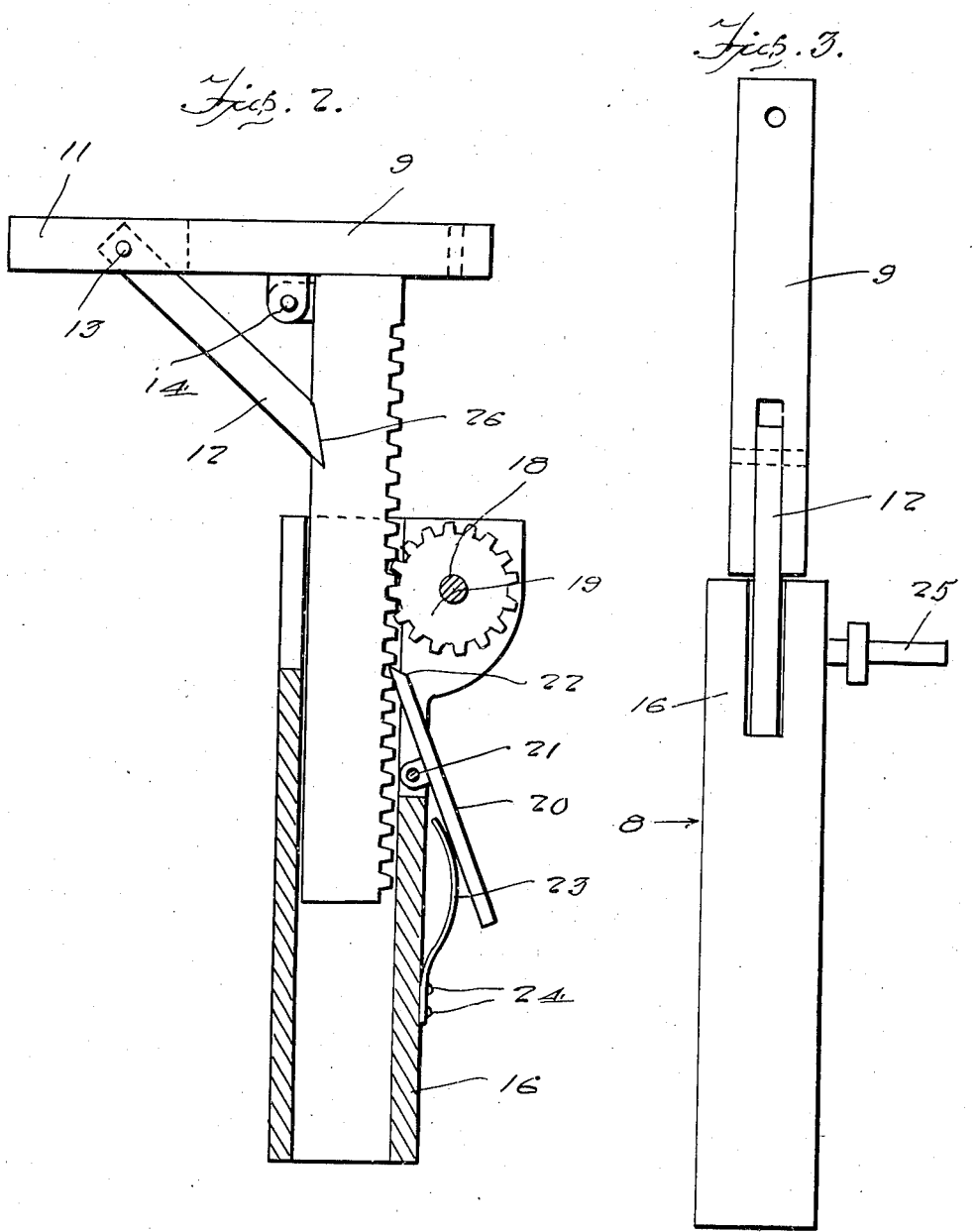

Patented Apr. 11, 1939

2,153,722

UNITED STATES PATENT OFFICE 2,153,722

TRAILER TONGUE SUPPORTING JACK

William N. Loughmiller, Mitchell, Oreg., assignor of one-half to Charles R. Jackson, Mitchell, Oreg.

Application May 14, 1938, Serial No. 208,006

2 Claims. (Cl. 254—86)

The present invention relates to new and useful improvements in supports and more particularly to an adjustable support of the extensible jack type for supporting the draft tongue of a trailer, especially the two-wheeled type.

The principal object of the present invention is to provide an adjustable support for trailer tongues which can be readily disposed into position for use in supporting the tongue almost instantly.

Another important object of the invention is to provide a tongue support of the character stated which is constantly carried by the tongue and adapted to be readily positioned for use quickly and without any exertion on the part of the operator.

These and various other important objects and advantages of the invention will become apparent to the reader of the following specification.

In the drawings:—

Figure 1 represents a side elevational view of a two-wheel trailer showing the supporting jack in useful position.

Figure 2 is a side elevational view of the jack, shown partly in section and in useful position.

Figure 3 is a side elevational view of the jack.

Figure 4 is a detailed sectional view showing the hinged connection of the jack with the tongue.

Referring to the drawings wherein like numerals designate like parts, it can be seen that numeral 5 generally refers to the trailer of the two-wheeled type including the wheels 6, only one of which is shown in Figure 1.

Numeral 7 denotes the usual draft tongue. The foregoing construction is conventional, the present invention being generally referred to by numeral 8.

In carrying out the present invention, a block 9 is bolted as at 10 to the tongue inwardly of its free end, one end of this block 9 being bifurcated as at 11 to receive the brace bar 12, which is pivotally supported by the pin 13 between the furcations of the block 9.

Hingedly connected as at 14 to the bottom side of the block 9 is the rack bar 15 which extends downwardly into the barrel 16, which barrel is provided with a pair of laterally disposed flanges 17 which is spanned by the shaft 18, which carries the gear 19, the gear being located between the flanges 17 and being in mesh with the teeth of the rack bar 15.

A rockable pawl 20 having its fulcrum as at 21, also has its beveled upper end 22 engageable with the teeth of the rack bar 15. This beveled end of the pawl 20 is retained engaged with the rack bar 15 by the strip spring 23 which is suitably anchored or secured as at 24 to the aforementioned barrel 16.

One end of the gear shaft 18 is equipped with the crank handle 25 whereby the gear 18 can be rotated with the result that the rack bar 15 is elevated to retain the tongue 7 in a level position, or in fact any other position desired.

The upper portion of the rack bar 15 is formed with the notch 26 for receiving the beveled free end of the brace rod 12.

As is shown in Figure 1, a loop-like member 27 has its upper portion suitably secured as at 28 to the tongue 7, this loop-like member depending below the tongue 7 and being in a position to receive the barrel 16, when the jack is collapsed to the position shown in Figure 1 and the barrel shifted rearwardly, all as is clearly shown in dotted lines in Figure 1.

The brace 12 serves to prevent self-collapsing of the jack when the jack is in useful position.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A jack structure comprising a barrel, a rack bar slidable in the barrel, means on the barrel engageable with the teeth of the rack bar for feeding the rack bar relative to the barrel, an attaching block at the outer end of the rack bar, a pivotal connection between the rack bar and the block, and brace means between the block and the rack bar, said block being bifurcated at one end, said brace means including a prop having one end pivotally connected to the block within the bifurcated end thereof, said rack bar being formed with a notch for receiving the remaining end of the prop.

2. In combination, a vehicle tongue, a jack at the free end portion of the tongue, said jack having a laterally disposed ear at the upper portion thereof, a lug depending from the tongue, a pivotal connection between the lug and the ear, the upper end of the jack being adapted to abut the tongue when the jack is in upright position, the upper portion of the jack being formed with a recess, a brace member, a pivotal connection between the brace member and the tongue at the vehicle side of the jack, said brace member having a bevelled free end portion for disposition in the recess of the jack.

WILLIAM N. LOUGHMILLER.